(12) United States Patent
Onoe et al.

(10) Patent No.: US 10,076,725 B2
(45) Date of Patent: Sep. 18, 2018

(54) EXHAUST GAS PURIFICATION CATALYST

(71) Applicants: CATALER CORPORATION, Kakegawa-shi, Shizuoka (JP); TOYOTA JIDOSHA KABUSHIKI KAISHA, Toyota-shi, Aichi (JP)

(72) Inventors: Ryota Onoe, Kakegawa (JP); Shingo Sakagami, Kakegawa (JP); Yasutaka Nomura, Kakegawa (JP); Yuta Morishita, Kakegawa (JP); Junji Kuriyama, Kakegawa (JP); Hiroshi Sekine, Kakegawa (JP); Daisuke Ochiai, Kakegawa (JP); Naoto Miyoshi, Nagoya (JP); Masahiko Takeuchi, Toyota (JP); Akemi Sato, Toyota (JP)

(73) Assignees: CATALER CORPORATION, Kakegawa-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/550,078

(22) PCT Filed: Feb. 16, 2016

(86) PCT No.: PCT/JP2016/054432
§ 371 (c)(1),
(2) Date: Aug. 10, 2017

(87) PCT Pub. No.: WO2016/133085
PCT Pub. Date: Aug. 25, 2016

(65) Prior Publication Data
US 2018/0021726 A1    Jan. 25, 2018

(30) Foreign Application Priority Data
Feb. 17, 2015    (JP) .................................. 2015-028795

(51) Int. Cl.
*B01J 23/10*    (2006.01)
*B01J 23/44*    (2006.01)
(Continued)

(52) U.S. Cl.
CPC ............ *B01D 53/945* (2013.01); *B01J 23/63* (2013.01); *B01J 35/0006* (2013.01); *B01J 35/04* (2013.01);
(Continued)

(58) Field of Classification Search
CPC ... B01J 23/10; B01J 23/44; B01J 23/46; B01J 23/63; B01J 35/0006; B01J 35/04
See application file for complete search history.

(56) References Cited

U.S. PATENT DOCUMENTS

| 8,323,599 B2 | 12/2012 | Nunan et al. | |
| 8,394,348 B1 * | 3/2013 | Nunan | B01D 53/945 423/213.2 |

(Continued)

FOREIGN PATENT DOCUMENTS

| DE | 10 2005 005 663 A1 | 8/2006 |
| DE | 10 2010 055 147 A1 | 6/2012 |

(Continued)

OTHER PUBLICATIONS

Apr. 19, 2016 Search Report issued in International Patent Application No. PCT/JP2016/054432.
(Continued)

*Primary Examiner* — Cam N. Nguyen
(74) *Attorney, Agent, or Firm* — Oliff PLC

(57) ABSTRACT

A wall-flow-type exhaust gas purification catalyst with an oxygen storage material that has an increased OSC and exhibits its OSC without a compromise provides an exhaust gas purification catalyst having a wall-flow-type substrate, a first catalytic layer and a second catalytic layer. The first
(Continued)

catalytic layer is provided to an internal portion of a partition wall in contact with an entrance cell. The second catalytic layer is provided to an internal portion of a partition wall in contact with an exit cell. Each of the first and second catalytic layers has an oxygen storage material. The ratio ($D_1/D_2$) of the coating density $D_1$ of the first catalytic layer to the coating density $D_2$ of the second catalytic layer is 1.1 to 1.8.

13 Claims, 4 Drawing Sheets

(51) Int. Cl.
| | |
|---|---|
| B01J 23/46 | (2006.01) |
| B01J 23/63 | (2006.01) |
| B01J 35/00 | (2006.01) |
| B01J 35/04 | (2006.01) |
| B01D 53/94 | (2006.01) |
| F01N 3/10 | (2006.01) |
| F01N 3/08 | (2006.01) |
| F01N 3/28 | (2006.01) |

(52) U.S. Cl.
CPC ......... B01D 2255/1023 (2013.01); B01D 2255/1025 (2013.01); B01D 2255/908 (2013.01); B01D 2255/9022 (2013.01); B01D 2255/9155 (2013.01); F01N 3/0864 (2013.01); F01N 3/10 (2013.01); F01N 3/281 (2013.01); F01N 2330/02 (2013.01); F01N 2510/0684 (2013.01)

(56) References Cited

U.S. PATENT DOCUMENTS

| | | | | |
|---|---|---|---|---|
| 8,557,204 | B2* | 10/2013 | Nunan | B01D 53/945 |
| | | | | 422/177 |
| 8,758,695 | B2* | 6/2014 | Neubauer | B01D 53/944 |
| | | | | 422/177 |
| 8,968,690 | B2* | 3/2015 | Nunan | B01D 53/945 |
| | | | | 422/177 |
| 9,347,349 | B2* | 5/2016 | Blakeman | B01D 53/9431 |
| 9,352,279 | B2* | 5/2016 | Greenwell | F01N 3/101 |
| 9,366,166 | B2* | 6/2016 | Blakeman | B01D 53/9431 |
| 9,486,793 | B2* | 11/2016 | Klingmann | B01J 37/024 |
| 9,789,443 | B2* | 10/2017 | Greenwell | B01D 53/9454 |
| 2004/0175315 | A1 | 9/2004 | Brisley et al. | |
| 2006/0057046 | A1 | 3/2006 | Punke et al. | |
| 2009/0087365 | A1 | 4/2009 | Klingmann et al. | |
| 2011/0014099 | A1 | 1/2011 | Dornhaus et al. | |
| 2011/0030346 | A1 | 2/2011 | Neubauer et al. | |
| 2011/0201493 | A1 | 8/2011 | Goto et al. | |
| 2012/0058020 | A1 | 3/2012 | Takagi et al. | |
| 2013/0058848 | A1* | 3/2013 | Nunan | B01D 53/945 |
| | | | | 423/213.5 |
| 2014/0301924 | A1 | 10/2014 | Morgan | |
| 2015/0152768 | A1* | 6/2015 | Arulraj | F01N 3/2828 |
| | | | | 428/117 |

FOREIGN PATENT DOCUMENTS

| | | |
|---|---|---|
| EP | 2 275 194 A1 | 1/2011 |
| EP | 2 489 844 A1 | 8/2012 |
| JP | 2005-500147 A | 1/2005 |
| JP | 2007-185571 A | 7/2007 |
| JP | 2009-082915 A | 4/2009 |
| JP | 2010-269205 A | 12/2010 |
| JP | 2011-167582 A | 9/2011 |
| JP | 2013-099748 A | 5/2013 |
| JP | 2014001679 A | 1/2014 |
| WO | 01/12320 A1 | 2/2001 |
| WO | 2010/004320 A2 | 1/2010 |
| WO | 2010/110298 A1 | 9/2010 |
| WO | 2011/125771 A1 | 10/2011 |

OTHER PUBLICATIONS

Dec. 15, 2017 Extended European Search Report issued in European Application No. 16752473.5.
Apr. 19, 2016 Search Report issued in International Patent Application No. PCT/JP2016/054434.
Jan. 12, 2018 Office Action issued in U.S. Appl. No. 15/550,252.
Dec. 12, 2017 extended European Search Report issued in European Application No. 16752471.9.

* cited by examiner

→ Running direction
(axial direction of cylinder)

EXHAUST GAS PURIFICATION CATALYST

TECHNICAL FIELD

The present invention relates to an exhaust gas purification catalyst provided to an exhaust system of an internal combustion system. In particular, it relates to a wall-flow-type exhaust gas purification catalyst.

The present application is a national stage of PCT/JP2016/054432, filed Feb. 16, 2016, which in turn claims priority to Japanese Patent Application No. 2015-28795 filed on Feb. 17, 2015; the entire contents of which are incorporated herein by reference.

BACKGROUND ART

Exhaust gas emitted from an internal combustion system such as an automobile engine comprises toxic components such as hydrocarbons (HC), carbon monoxide (CO), nitrogen oxides ($NO_x$), and particulate matter (PM). Conventionally, to efficiently eliminate these exhaust components, an exhaust purification catalyst having a catalytic layer is used, with the catalytic layer comprising a carrier and a catalytic metal supported on the carrier.

For instance, a wall-flow-type exhaust gas purification catalyst comprises a wall-flow-type substrate and a catalytic layer. The wall-flow-type substrate has an entrance cell that is open on the exhaust inlet-side end, an exit cell that is open on the exhaust outlet-side end, and a porous partition wall (a ribbed wall) separating the two cells. The catalytic layer is provided to the interior or to the surface of the partition wall. Exhaust gas emitted from the internal combustion system flows via the exhaust inlet-side end into the entrance cell, passes through micro pores of the porous partition wall, and flows out of the exhaust outlet-side end of the exit cell. During this, upon contact between the exhaust gas and the catalytic layer (catalytic metal), the toxic components are purified (detoxified).

As for the art related to this, Patent Documents 1 to 4 are cited. For instance, Patent Document 1 discloses an exhaust gas purification catalyst comprising a catalytic layer having a two-layer structure. In particular, it discloses an exhaust gas purification catalyst that has a first catalytic layer (a Pd-containing layer) in the interior of the partition wall and a second catalytic layer (a Rh-containing layer) over the entire surface of the partition wall to completely cover the first catalytic layer, wherein solely the second layer additionally comprises a ceria-zirconia composite oxide capable of absorbing oxygen.

CITATION LIST

Patent Literature

[Patent Document 1] Japanese Patent Application Publication No. 2009-82915
[Patent Document 2] Japanese Patent Application Publication No. 2007-185571
[Patent Document 3] WO 2011/125771
[Patent Document 4] Japanese Patent Application Publication No. 2011-167582

SUMMARY OF INVENTION

When an exhaust gas purification catalyst includes an oxygen storage material (an oxygen storage capacity (OSC) material) such as a ceria/zirconia composite oxide, exhaust gas in the exhaust gas purification catalyst can be stably maintained near-stoichiometric (near the theoretical air-fuel ratio). In other words, the OSC material works to store oxygen in the exhaust gas when the exhaust gas is at a lean air-fuel ratio (i.e. in an excess of oxygen) and to release oxygen when the exhaust gas is at a rich air-fuel ratio (i.e. in an excess of fuel). This allows the atmosphere in the exhaust gas purification catalyst to remain near-stoichiometric even when the oxygen concentration in the exhaust gas changes. As a result, stable catalytic performance can be obtained and the purification performance may improve.

However, according to studies by the present inventors, there has been further room for improvement in conventional embodiments. In particular, for reduction of manufacturing costs and like purpose, the use of catalytic metal(s) tends to be reduced. A catalytic metal serves to mediate storage of oxygen in a lean atmosphere. Thus, in an exhaust gas purification catalyst with less catalytic metal content, the oxygen storage rate (i.e. the oxygen storage capacity, OSC) of the OSC material will significantly decrease. The OSC of the exhaust gas purification catalyst may increase, for instance, by increasing the OSC material content itself. However, this method will instead lead to an increase in pressure loss when the exhaust gas passes through the partition wall. Accordingly, to compensate for a decrease in OSC as described above, it is desired to increase the OSC itself of the exhaust gas purification catalyst.

In addition, for instance, the exhaust gas purification catalyst of Patent Document 1 comprises a Pd-containing layer in the entire interior of the partition wall and a Rh-containing layer is further placed to cover the surface of the partition wall. This makes the partition wall less permeable to exhaust gas, giving rise to a problem of increased pressure loss.

The present invention has been made in view of these circumstances with an objective to provide a wall-flow-type exhaust gas purification catalyst with an oxygen storage material that has an increased OSC and exhibits its OSC without a compromise.

The present inventors have conducted many studies in various aspects to find a solution to the problem in exhaust gas purification catalysts comprising wall-flow-type substrates. As a result, they have conceived an idea of controlling the pressure loss in the running direction of the partition wall to adjust the exhaust gas flow. Upon further studies, the present invention has been completed.

In particular, the present invention provides a wall-flow-type exhaust gas purification catalyst to be placed in an exhaust pipe of an internal combustion system to purify exhaust gas emitted from the internal combustion system. The exhaust gas purification catalyst comprises a substrate having a wall-flow structure (or simply a wall-flow substrate, hereinafter), a first catalytic layer, and a second catalytic layer.

In the wall-flow substrate, an entrance cell that is open on the exhaust inlet-side end and an exit cell that is open on the exhaust outlet-side end are separated with a porous partition wall. The first catalytic layer is provided to an internal portion of the partition wall in contact with the entrance cell, having a length $L_1$ from the exhaust inlet-side end in the running direction of the partition wall with $L_1$ being less than the total length $L_w$ of the partition wall in the running direction. The second catalytic layer is provided to an internal portion of the partition wall in contact with the exit cell, having a length $L_2$ from the exhaust outlet-side end in the running direction of the partition wall with $L_2$ being less than the total length $L_w$ of the partition wall in the running direction. In the internal portion of the partition wall in contact with the entrance cell, near the exhaust outlet-side end, the catalyst has a substrate-exposing segment free of the first and second catalytic layers. Each of the first and second catalytic layers comprises an oxygen storage material. The ratio ($D_1/D_2$) of the first catalytic layer's coating density $D_1$ to the second catalytic layer's coating density $D_2$ is 1.1 or higher, but 1.8 or lower. In other words, the coating density ratio ($D_1/D_2$) satisfies the next inequality $1.1 \leq D_1/D_2 \leq 1.8$.

In the exhaust gas purification catalyst, each of the two catalytic layers includes an OSC material. In the partition wall of the substrate, the two catalytic layers satisfying the coating density ratio ($D_1/D_2$) of 1.1 to 1.8 and the substrate-exposing segment are placed to adjust the exhaust gas flow (e.g. the flow field and the flow rate of exhaust gas). For instance, as compared to the constitution described in Patent Document 1, such a constitution can increase opportunities for contact between exhaust gas and the OSC materials. As a result, while the pressure loss is reduced, the OSC of the oxygen storage materials can be effectively obtained. Thus, the present invention can achieve an exhaust gas purification catalyst that has a higher OSC than conventional products as well as excellent purification performance in an embodiment where the oxygen concentration in exhaust gas changes.

As used herein, the concept of "(a catalytic layer) being provided to an internal portion of the partition wall" means that the catalytic layer is more heavily present (localized) in the inside of the partition wall than in the outside (typically on the surface) of the partition wall. For instance, when a partition wall cross section of the first catalytic layer is analyzed under an electron microscope, with the overall coating density over a length $0.1L_w$ from the exhaust inlet-side end in the running direction being 100%, it means that the density distribution of the coating present in the inside of the partition wall is typically 80% or higher, for instance, 90% or higher, or preferably 95% or higher, in particular, essentially 100%. Or, for instance, when a partition wall cross section of the second catalytic layer is analyzed under an electron microscope, with the overall coating density over a length $0.1L_w$ from the exhaust outlet-side end in the running direction being 100%, it means that the density distribution of the coating present in the inside of the partition wall is typically 80% or higher, for instance, 90% or higher, or preferably 95% or higher, in particular, essentially 100%. Thus, the concept should be clearly distinguished from, for instance, an embodiment where a catalytic layer is provided to the surface of a partition wall and some of the catalytic layer is unintentionally impregnated into the partition wall.

As used herein, the term "coating density" refers to the coating amount (g) of a catalytic layer per L volume of substrate (total bulk volume including the cell volume). The unit is g/L.

For instance, a reference substrate prior to catalytic layer coating and a catalytic layer-bearing substrate are individually suspended in a solvent (e.g. in water); their masses in the solvent are determined by the Archimedes method; and the coating density can be determined by the next equation (1):

$$\rho = W \times \rho(1)/(W-W') \quad (1)$$

Here, $\rho$ is the coating density (g/L) of the catalytic layer; W is the mass of the catalytic layer in the atmosphere determined by subtracting the mass of the reference substrate in the atmosphere from the mass of the catalytic layer-bearing substrate in the atmosphere; $\rho(1)$ is the density of the solvent (e.g. water).

In a preferable embodiment of the exhaust gas purification catalyst disclosed herein, $D_1/D_2$ is 1.4 or higher, but 1.7 or lower. This can bring the effects of the present invention to a higher level.

In a preferable embodiment of the exhaust gas purification catalyst disclosed herein, the exhaust gas purification catalyst has an overall average catalyst coating density $D_A$ of 40 g/L or greater, but 150 g/L or less. This can combine the effect to increase the OSC of the oxygen storage material(s) and reduction of pressure loss at a higher level.

In another preferable embodiment of the exhaust gas purification catalyst disclosed herein, the oxygen storage material content $O_1$ per L of the substrate in the first catalytic layer and the oxygen storage material content $O_2$ per L of the substrate in the second catalytic layer satisfy $O_1 > O_2$.

For instance, this can more stably increase the oxygen storage capacity in a lean atmosphere.

In a preferable embodiment of the exhaust gas purification catalyst disclosed herein, the $O_1$ to $O_2$ ratio ($O_1/O_2$) is 1.4 or higher, but 1.7 or lower. This can bring the effects of the present invention to a higher level.

In a preferable embodiment of the exhaust gas purification catalyst disclosed herein, the oxygen storage material content $O_1$ is 30 g/L or greater, but 50 g/L or less; and the oxygen storage material content $O_2$ is 20 g/L or greater, but 35 g/L or less. This can combine the effect to increase the OSC of the oxygen storage material(s) and reduction of pressure loss at a higher level.

In a preferable embodiment of the exhaust gas purification catalyst disclosed herein, each of the first and second catalytic layers comprises the oxygen storage material as a promoter carrying no catalytic metal.

For instance, this can further increase the oxygen storage capacity in a lean atmosphere.

In a preferable embodiment of the exhaust gas purification catalyst disclosed herein, the first catalytic layer comprises rhodium. In other words, the first catalytic layer preferably includes a highly reducible precious metal (rhodium).

In a preferable embodiment of the exhaust gas purification catalyst disclosed herein, the second catalytic layer comprises palladium. In other words, the second catalytic layer preferably includes a highly oxidizable metal (palladium).

In such an embodiment, it can efficiently purify toxic components of exhaust gas. As a result, the exhaust purification performance can be further enhanced.

In a preferable embodiment of the exhaust gas purification catalyst disclosed herein, $L_w$, $L_1$ and $L_2$ satisfy the next inequality $L_w < (L_1 + L_2) < 2L_w$. That is, the first and second catalytic layers are formed, partially overlapping each other in the running direction.

In another preferable embodiment of the exhaust gas purification catalyst disclosed herein, the partition wall has a total thickness $T_w$ in a direction perpendicular to the running direction of the partition wall, the first catalytic layer has a thickness $T_1$, and the second catalytic layer has a thickness $T_2$, with $T_w$, $T_1$ and $T_2$ satisfying the next inequality $T_w < (T_1 + T_2) < 2T_w$. That is, the first and second catalytic layers are formed, partially overlapping each other in the thickness direction.

With the two catalytic layers (the first and second catalytic layers) partially overlapping each other in the running direction and/or in the thickness direction, no fraction of exhaust gas flows through the partition wall without passing through a catalytic layer. Thus, exhaust gas can be more suitably purified (detoxified).

DESCRIPTION OF EMBODIMENTS

Figure 1:
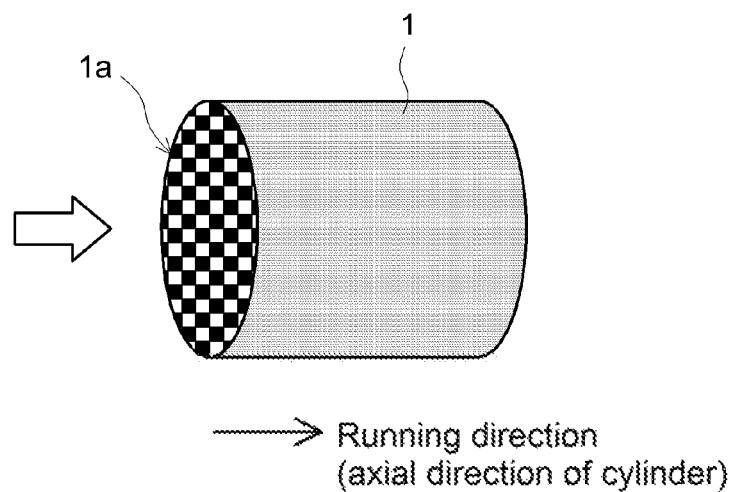
FIG. 1 shows a perspective diagram schematically illustrating the substrate in the exhaust gas purification catalyst according to an embodiment.

Some preferred embodiments of the present invention are described below with reference to drawings. In the drawings below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

As used herein, the expression "A≈B (note: A and B are arbitrary values)" may include variation (differences among individual pieces) occurring during the manufacturing process. For instance, it means that the difference between A and B is about ±10%, typically about ±5%, or preferably about ±2%.

As used herein, "A to B (note: A and B are arbitrary values)" includes the values A and B (the minimum value and the maximum value).

The exhaust gas purification catalyst disclosed herein is a so-called wall-flow-type, comprising a wall-flow substrate and two catalytic layers (the first and second catalytic layers). Such an exhaust gas purification catalyst exhibits effects unique to the present invention, with the interior of the substrate provided with two catalytic layers and at least one substrate-exposing segment in a certain arrangement, with each of the two catalytic layers comprising an oxygen storage material, and the ratio ($D_1/D_2$) of the first catalytic layer's coating density $D_1$ to the second catalytic layer's coating density $D_2$ satisfying the prescribed range. Thus, other features are not particularly limited and can be arbitrarily selected according to various standards.

For the substrate constructing the frame of the exhaust gas purification catalyst, various forms of substrates conventionally used for this type of application can be used.

FIG. 1 shows a schematic perspective view of substrate 1 in exhaust gas purification catalyst 10 according to an embodiment. This embodiment uses a honeycomb substrate (honeycomb structure) 1 having a cylindrical appearance. The appearance of the entire honeycomb substrate 1 can be, for instance, elliptic cylindrical, polygonal cylindrical, etc., instead of the cylindrical shape shown in FIG. 1. Honeycomb substrate 1 has partition walls formed in the running direction (in the axial direction of the cylinder) and several cells that are separated with the partition walls and arranged regularly. In honeycomb substrate 1, at one end 1a, open ends of the running direction are alternately sealed between adjacent cells.

Figure 2:
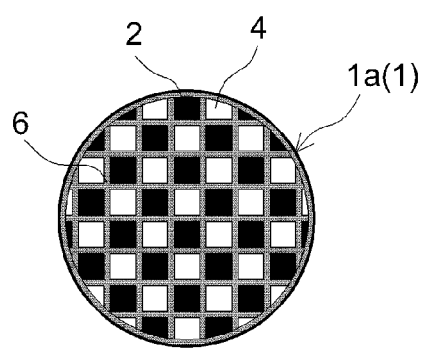
FIG. 2 shows a cross-sectional diagram schematically illustrating one end of the honeycomb substrate in FIG. 1.

FIG. 2 shows a schematic cross-sectional view of the end 1a of honeycomb substrate 1 in FIG. 1. In this embodiment, the end 1a is circular. At the end 1a, porous partition walls 6 are placed between adjacent cells. Sealing members 2 and openings 4 are arranged in a checkered pattern.

As the material of honeycomb substrate 1, various materials conventionally used for this type of application can be used. In view of harsh conditions under which internal combustion systems may be operated, it is preferably formed from a material having stable properties even when exposed to exhaust gas at a high temperature (e.g. 400° C. or above). Preferable examples include ceramic such as cordierite, aluminum titanate and silicon carbide (SiC), and alloys such as stainless steel.

Honeycomb substrate 1 has a storage capacity (a total cell volume) of typically 0.1 L or greater, or preferably 0.5 L or greater, it can be, for instance, 5 L or less, preferably 3 L or less, or more preferably 2 L or less. The overall length of honeycomb substrate 1 in the axial direction of the cylinder (i.e. the total length $L_w$ of a partition wall 6 in the running direction) can be typically 10 mm to 500 mm, for instance, about 50 mm to 300 mm.

Figure 3:
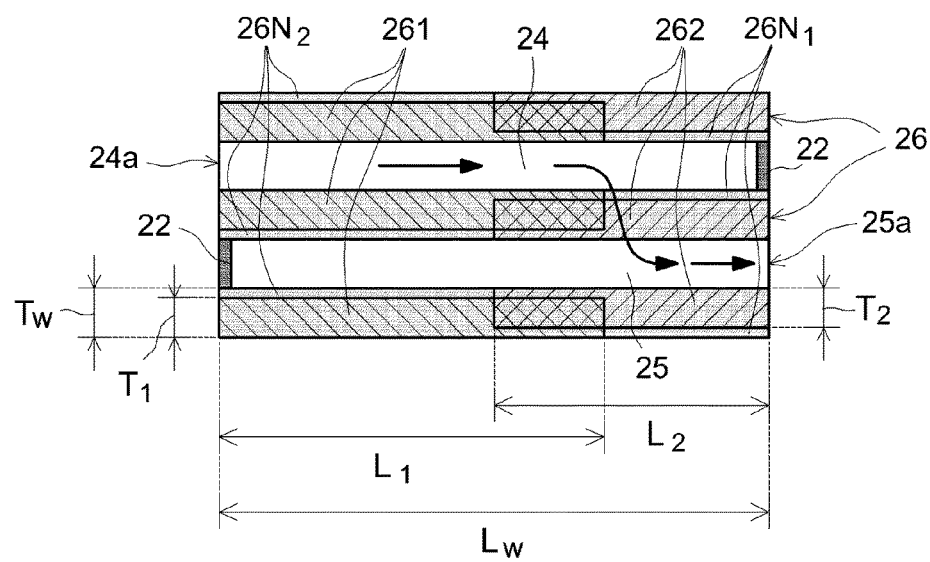
FIG. 3 shows an enlarged cross-sectional diagram schematically illustrating the structure in the vicinity of the partition wall of the exhaust gas purification catalyst according to an embodiment.

FIG. 3 shows a schematic enlarged cross-sectional view of the structure of exhaust gas purification catalyst 10 according to an embodiment, showing the vicinity of partition wall 26. In the substrate of exhaust gas purification catalyst 10 shown in FIG. 3, an entrance cell 24 (in a U shape) with an opening 4 on the exhaust inlet-side end 24a and an exit cell 25 (in a U shape) with an opening 4 on the exhaust outlet-side end 25a are separated with a porous partition wall 26. To the exhaust outlet-side end of entrance cell 24 and the exhaust inlet-side end of exit cell 25, sealing members 22 are provided to seal the cells.

For instance, entrance cell 24 and exit cell 25 can be designed to have shapes and dimensions suited in view of the flow rate and components of exhaust gas supplied to the exhaust gas purification catalyst 10, etc. The shape of entrance cell 24 or exit cell 25 is not particularly limited; for instance, it can be various geometric shapes such as quadrilaterals including square, parallelogram, rectangle and trapezoid; triangle, other polygon (e.g. hexagon, octagon), and circle.

Partition wall 26 has a porous structure permeable to exhaust gas. The overall thickness $T_w$ of partition wall 26 (i.e. the length of partition wall 6 in a direction perpendicular to its running direction) can be, for instance, about 0.05 mm to 2 mm from the standpoint of enhancing the exhaust purification performance, increasing the mechanical strength, reducing the increase in pressure loss, etc. The porosity of partition wall 26 can usually be about 40% to 70% from the standpoint of increasing the mechanical strength, reducing the increase in pressure loss, etc. The average pore diameter of partition wall 26 can usually be about 10 µm to 40 µm from the standpoint of increasing the PM-collecting ability, reducing the increase in pressure loss, etc.

Exhaust gas purification catalyst 10 disclosed herein comprises two catalytic layers having prescribed characteristics (e.g. lengths, thicknesses, coating densities, and OSC material content densities)—namely, the first catalytic layer 261 and the second catalytic layer 262—in the interior of partition wall 26 (in particular, on the inner surfaces of the pores in partition wall 26). With the catalytic layers placed in the interior of partition wall 26, that is, with the first and second catalytic layers 261 and 262 not substantially (intentionally) provided to the surface of partition wall 26, it is possible to suitably obtain flow channels for exhaust gas while effectively reducing the increase in pressure loss.

In exhaust gas purification catalyst 10, exhaust gas released from an internal combustion system flows from the exhaust inlet-side end 24a into entrance cell 24. As indicated with the arrow in FIG. 3, upon entering entrance cell 24, the exhaust gas passes through pores in porous partition wall 26 and flows out of the exhaust outlet-side end 25a. In exhaust gas purification catalyst 10, while the exhaust gas passes through the interior of partition wall 26, it makes contact with the catalytic layers (the first catalytic layer 261 and/or the second catalytic layer 262). This purifies (detoxifies) toxic components of the exhaust gas. For instance, HC and CO in the exhaust gas are oxidized by the catalytic activities of a catalytic layer and converted (purified) to water ($H_2O$), carbon dioxide ($CO_2$), etc. $NO_x$ is reduced by the catalytic activity of a catalytic layer and converted (purified) to nitrogen ($N_2$). PM is unlikely to pass through pores in partition wall 26; and therefore, it generally accumulates on partition wall 26 in entrance cell 24 (e.g. near sealing member 22 on partition wall 26). The accumulated PM is decomposed by spontaneous combustion catalyzed by the first catalytic layer 261 or by forced combustion at a prescribed temperature (e.g. about 500° C. to 700° C.).

A structure contrasting to the wall-flow-type is the so-called straight type. In a straight-type exhaust gas purification catalyst, from early stages (upstream) to later stages (downstream) in the substrate, exhaust gas reacts with the catalytic layer(s) in order, whereby toxic components are purified. Thus, in the straight-type exhaust gas purification catalyst, catalytic metal species and the arrangement of the catalytic layer(s) (length, a layered structure in the thickness direction, etc.) are decided in view of the order of purification reactions. On the other hand, in the wall-flow-type exhaust gas purification catalyst disclosed herein, the arrangement and properties of the catalytic layers are decided in order to control the exhaust gas flow in the catalyst (in particular, through the partition wall). In this view, the wall-flow type is greatly different from the straight type in a technical sense.

Both the first and second catalytic layers 261 and 262 are provided to the interior of partition wall 26 in exhaust gas purification catalyst 10. When both the two catalytic layers are provided to the interior of partition wall 26, a large opening area of partition wall 26 can be obtained as compared to, for instance, an embodiment where at least one of the two catalytic layers is provided to the surface of partition wall 26.

The two catalytic layers serve as fields for exhaust gas purification, thereby constituting the main part of exhaust gas purification catalyst 10. In typical, each of the two catalytic layers comprises a catalytic metal serving oxidation and/or reduction catalyst, a carrier supporting the catalytic metal, and an oxygen storage material (OSC material). The carrier and the OSC material can be the same. In other words, the carrier supporting the catalytic metal may as well serve as the OSC material.

The OSC material(s) placed in the respective catalytic layers increases opportunities for contact between the OSC material(s) and exhaust gas. This is effective in increasing the OSC of exhaust gas purification catalyst 10 at large.

As the catalytic metal, one, two or more species can be suitably selected among various metals known to serve as oxidation catalysts or reduction catalysts. Typical examples include precious metals such as rhodium (Rh), palladium (Pd) and platinum (Pt) of the platinum group. Alternatively, ruthenium (Ru), osmium (Os), iridium (Ir), gold (Au), silver (Ag), copper (Cu), nickel (Ni), iron (Fe) and cobalt (Co) as well as alloys of the precious metals and these metals can be used.

It is preferable to use the catalytic metal as fine particles with particle diameters that are small enough in view of increasing the contact area with exhaust gas. The average particle diameter (the average value of particle diameters determined by TEM analysis; the same applies hereinafter) of the catalytic metal particles is usually about 1 nm to 15 nm, preferably 10 nm or smaller, 7 nm or smaller, or even 5 nm or smaller.

The catalytic metals in the two catalytic layers (the first and second catalytic layers 261 and 262) may be the same or different.

In a preferable example, the first catalytic layer 261 comprises rhodium (Rh). With the highly reactive rhodium in the first catalytic layer 261, an active purification reaction can occur upstream of exhaust gas (in the first catalytic layer 261). As a result, the heat of the purification reaction can be transferred downstream (to the second catalytic layer 262) to keep the entire catalyst at high temperatures (keep the catalyst temperature high). Thus, with the limited amounts of catalytic metal(s), the purification performance (especially for $NO_x$) can be effectively enhanced. For instance, this is especially effective in an embodiment where the exhaust gas temperature temporarily falls below the catalyst activation temperature (e.g. in an eco-friendly car in which the engine stops and starts repeatedly when the car makes temporary stops while driving or waiting at traffic lights).

In another preferable example, one catalytic layer (e.g. the first catalytic layer 261) comprises a highly reducible metal (e.g. rhodium) and the other catalytic layer (e.g. the second catalytic layer 262) comprises a highly oxidizing metal (e.g. palladium (Pd)). According to such an embodiment, toxic components of exhaust gas can be efficiently purified at once.

In each catalytic layer, the catalytic metal-carrying rate (the catalytic metal content with the carrier being 100% by mass) is not particularly limited. For instance, it can be decided in view of the lengths and thicknesses of the two catalytic layers 261 and 262, the flow rate of the exhaust gas supplied, etc.

In a preferable example, greater catalytic activities can be obtained when the catalytic metal-carrying rate in each catalytic layer is 0.05% to 1.5% by mass, preferably 0.1% to 1.5% by mass, or more preferably 0.2% to 1% by mass. When the carrying rate is at or above the prescribed value, excellent catalytic activities can be better obtained. When the carrying rate is at or below the prescribed value, particle growth (sintering) of the metal can be greatly inhibited to achieve high durability. It is also cost-effective. In addition, as described earlier, a low catalytic metal-carrying rate tends to reduce the OSC of an oxygen storage material; and therefore, when the catalytic metal-carrying rate is low, application of the present invention is particularly effective.

The catalytic metal-carrying rate of the first catalytic layer 261 can be the same as or different from that of the second catalytic layer 262. In a preferable embodiment, the ratio of the catalytic metal-carrying rate of the first catalytic layer 261 to the catalytic metal-carrying rate of the second catalytic layer 262 is generally 1 to 1.5, for instance, 1 to 1.2. In particular, the catalytic metal-carrying rate of the first catalytic layer 261 is higher than that of the second catalytic layer 262. This can effectively increase the catalytic activity upstream of exhaust gas purification catalyst 10 (at the first catalytic layer 261). As a result, active purification reactions occur at the first catalytic layer 261 to generate a large amount of heat of reaction (heat capacity). With the exhaust gas flow, the heat of reaction can be efficiently transferred downstream of exhaust gas purification catalyst 10 (to the second catalytic layer 262), thereby increasing the warm-up performance and the heat retention of exhaust gas purification catalyst 10. Thus, for instance, even in an embodiment where the exhaust gas temperature temporarily falls below the catalyst activation temperature (e.g. in an eco-friendly car in which the engine stops and starts repeatedly when the car makes temporary stops while driving or waiting at traffic lights), excellent catalytic activities can be stably obtained.

As the carrier to support the catalytic metal, one, two or more species can be suitably used among inorganic materials similarly used in conventional exhaust gas purification catalysts. In particular, a porous material having a relatively large specific surface area (which refers to a specific surface area determined by the BET method; the same applies hereinafter) is preferable. Preferable examples include alumina ($Al_2O_3$), ceria ($CeO_2$), zirconia ($ZrO_2$), silica ($SiO_2$), titania ($TiO_2$), and solid solutions of these (e.g. a ceria-zirconia composite oxide (CZ composite oxide)). Alumina and a CZ composite oxide are particularly preferable.

From the standpoint of the heat resistance and the structural stability, the carrier (e.g. alumina powder, CZ composite oxide powder) may have a specific surface area of generally about 10 $m^2/g$ to 500 $m^2/g$, for example, 200 $m^2/g$ to 400 $m^2/g$. The carrier may have an average particle diameter of about 1 nm to 500 nm, for example, 10 nm to 200 nm.

The species of carrier in the two catalytic layers (the first and second catalytic layers 261 and 262) may be the same or different.

The oxygen storage material (OSC material) serves to stably maintain the exhaust gas in exhaust gas purification catalyst 10 near-stoichiometric (near the theoretical air-fuel ratio). As the OSC material, one, two or more species can be suitably used among various compounds known to be capable of storing oxygen. Preferable examples include the aforementioned ceria ($CeO_2$) and a ceria-containing composite oxide (e.g. a CZ composite oxide). A CZ composite oxide is particularly preferable. In the CZ composite oxide, zirconia and ceria form a solid solution, whereby particle growth is inhibited. This can bring about excellent durability and excellent long-term OSC. The ratio of ceria to zirconia mixed in the CZ composite oxide can be about ceria/zirconia=0.25 to 0.75 (e.g. 0.3 to 0.6). This can increase the catalytic activities and the OSC in a well-balanced manner.

The species of OSC material in the two catalytic layers (the first and second catalytic layers 261 and 262) can be the same or different.

Each of the two catalytic layers comprises an OSC material as a carrier on which the catalytic metal particles are supported and/or as a promoter not carrying catalytic metal particles. The embodiments of the OSC material can be the same or different between the two catalytic layers (the first and second catalytic layers 261 and 262).

In a preferable embodiment, the first catalytic layer 261 and/or the second catalytic layer 262 comprises the OSC material as a promoter. This can increase the oxygen storage rate (OSC) of the OSC material to bring the effects of the present invention to a higher level.

The OSC material content density $O_1$ (the OSC material content per L of the substrate) in the first catalytic layer 261 can be the same as or different from the OSC material content density $O_2$ (the OSC material content per L of the substrate) in the second catalytic layer 262. Preferably, the content density $O_1$ in the first catalytic layer 261 is higher than the content density $O_2$ in the second catalytic layer 262 (i.e. $O_2 < O_1$).

In a preferable embodiment, the ratio ($O_1/O_2$) of the OSC material content density $O_1$ in the first catalytic layer 261 to the OSC material content density $O_2$ in the second catalytic layer 262 is equal to the coating density ratio ($D_1/D_2$). That is, $O_1/O_2$ can be generally 1.1 to 1.8, or preferably 1.4 to 1.7. This brings the OSC-increasing effect to a higher level.

The OSC material content density $O_1$ in the first catalytic layer 261 is not particularly limited as it depends on the properties (e.g. the shape of cells, the thickness of the partition wall, the porosity) of the substrate. In a preferable example, from the standpoint of reducing the pressure loss, the OSC material content density $O_1$ in the first catalytic layer 261 is generally 80 g/L or lower, preferably 70 g/L or lower, or more preferably 50 g/L or lower, for instance, 45 g/L or lower. In another preferable example, from the standpoint of increasing the OSC, the OSC material content density $O_1$ in the first catalytic layer 261 is generally 10 g/L or higher, preferably 20 g/L or higher, or more preferably 30 g/L or higher, for instance, 40 g/L or higher.

The OSC material content density $O_2$ in the second catalytic layer 262 is not particularly limited as it depends on the properties (e.g. the shape of cells, the thickness of the partition wall, the porosity) of the substrate. In a preferable example, from the standpoint of reducing the pressure loss, the OSC material content density $O_2$ in the second catalytic layer 262 is generally 60 g/L or lower, preferably 55 g/L or lower, or more preferably 50 g/L or lower, for instance, 35 g/L or lower. In another preferable example, from the standpoint of increasing the OSC, the OSC material content density $O_2$ in the second catalytic layer 262 is generally 5 g/L or higher, or preferably 10 g/L or higher, for instance, 20 g/L or higher.

In addition to the aforementioned components, other optional components may be added to the two catalytic layers (the first and second catalytic layers 261 and 262). Such optional components may be included in each catalytic layer, for instance, as an additional element forming the carrier and/or the OSC material or as an entity independent from the carrier and/or the OSC material. Examples of the additional components include alkali metals, alkaline earth metals (e.g. barium), rare earth metal compounds and oxides.

In exhaust gas purification catalyst 10 disclosed herein, the two catalytic layers (the first and second catalytic layers 261 and 262) have a coating density ratio in a prescribed range. In particular, the ratio ($D_1/D_2$) of the coating density $D_1$ in the first catalytic layer 261 to the coating density $D_2$ in the second catalytic layer 262 is 1.1 to 1.8. In other words, the coating density $D_1$ of the first catalytic layer 261 is 1.1 times to 1.8 times the coating density $D_2$ of the second catalytic layer 262. The difference in coating density between the first and second catalytic layers 261 and 262 creates an area readily permeable to exhaust gas in the running direction of partition wall 26 and a less permeable area, giving rise to a distribution of pressure loss. By this, the exhaust gas flow in partition wall 26 can be adjusted.

When $1.1 \leq D_1/D_2$ is satisfied, the pressure loss in the first catalytic layer 261 increases. This makes where the first catalytic layer 261 is formed in partition wall 26 less permeable to exhaust gas. Thus, upon entering entrance cell 24 via the exhaust inlet-side end 24a, exhaust gas is more likely to flow straight up through entrance cell 24 to where the first catalytic layer 261 is not formed. The exhaust gas linearly flowing through entrance cell 24 prefers to pass through where the first catalytic layer 261 is not formed (typically where solely the second catalytic layer 262 is formed) to reach exit cell 26. As a result, in entrance cell 24, the exhaust gas and the OSC material of the first catalytic layer 261 will have increased opportunities for contact (contact area). Thus, the efficiency of storing oxygen into the OSC material can be increased, whereby the OSC of exhaust gas purification catalyst 10 at large can be effectively increased.

A preferable embodiment satisfies $1.2 \leq D_1/D_2$, $1.4 \leq D_1 D_2$, for instance, $1.45 \leq D_1/D_2$. This can bring the effects described above to a higher level.

When $D_1/D_2 \leq 1.8$ is satisfied, the exhaust gas flows smoothly from entrance cell 24 to exit cell 25. This can reduce the pressure loss of exhaust gas purification catalyst 10 at large. In addition, according to the studies by the present inventors, when the difference in pressure loss between the two catalytic layers 261 and 262 is excessively large, the flow rate of the exhaust gas increases, causing the exhaust gas to quickly pass through the catalytic layers. This may unfavorably lower the rate of storing oxygen into the OSC material(s) or the purification performance.

A favorable embodiment satisfies $D_1/D_2 \leq 1.7$, for instance, $D_1/D_2 \leq 1.65$. This can combine reduction of the pressure loss of exhaust gas purification catalyst 10 at large and OSC-increasing effects at a higher level.

In a preferable embodiment, exhaust gas purification catalyst 10 has an overall average catalyst coating density $D_A$ of 40 g/L to 150 g/L. The pressure loss can be further reduced when the average catalyst coating density $D_A$ is 150 g/L or less, or preferably 120 g/L or less, for instance, 100 g/L or less. Greater purification performance can be obtained when the average catalyst coating density $D_A$ is 40 g/L or greater, or preferably 50 g/L or greater, for instance, 60 g/L or greater. Thus, the effects of this invention can be brought to a higher level.

The coating density $D_1$ of the first catalytic layer 261 is not particularly limited as it depends on the properties (e.g. the shape of cells, the thickness of the partition wall, the porosity) of the substrate. In a preferable example, from the standpoint of reducing the pressure loss (especially the surface pressure loss caused when the exhaust gas flows into exhaust gas purification catalyst 10), the coating density $D_1$ in the first catalytic layer 261 is generally 200 g/L or lower, or preferably 195 g/L or lower, for instance, 190 g/L or lower. In another preferable example, from the standpoint of increasing the purification performance upstream of exhaust gas purification catalyst 10 (in the area of the first catalytic layer 261), the coating density $D_1$ in the first catalytic layer 261 is generally 40 g/L or higher, preferably 45 g/L or higher, or more preferably 50 g/L or higher, for instance, 65 g/L or higher.

The coating density $D_2$ in the second catalytic layer 262 is not particularly limited as long as it satisfies the $D_1/D_2$ ratio. In a preferable example, from the standpoint of reducing the pressure loss, the coating density $D_2$ in the second catalytic layer 262 is generally 150 g/L or lower, or preferably 140 g/L or lower, for instance, 130 g/L or lower. In another preferable example, the coating density $D_2$ in the second catalytic layer 262 is generally 25 g/L or higher, preferably 30 g/L or higher, or more preferably 35 g/L or higher, for instance, 45 g/L or higher.

The first catalytic layer 261 is formed in the interior of partition wall 26 in contact with entrance cell 24, from the exhaust inlet-side end 24a in the running direction of partition wall 26.

The length $L_1$ of the first catalytic layer 261 in the running direction is not particularly limited as long as it is less than the total length $L_w$ of partition wall 26 in the running direction (i.e. $L_1<L_w$). When $L_1<L_w$ is satisfied, the increase in pressure loss can be favorably reduced to bring the effects of this invention to a higher level. From such a standpoint, $L_1$ preferably satisfies $L_1<0.9\ L_w$.

According to the studies by the present inventors, PM in exhaust gas is unlikely to pass through partition wall 26 and tends to accumulate near the exhaust outlet-side end 25a in entrance cell 24. Thus, in an internal portion of partition wall 26 in contact with entrance cell 24, it is preferable that the first catalytic layer 261 is absent in the vicinity of the exhaust outlet-side end 25a. This can favorably reduce the increase in pressure loss. From such a standpoint, $L_1<0.8\ L_w$ is preferably satisfied, and $L_1<0.75\ L_w$ is more preferably satisfied. In other words, in the interior of partition wall 26 in contact with entrance cell 24, it is preferable that the first catalytic layer 261 is not formed in the running direction from the exhaust outlet-side end 25a over at least 10% (preferably 20%, more preferably 25%) of $L_w$. In the embodiment shown in FIG. 3, $L_1 \approx 0.7\ L_w$, and the first catalytic layer 261 is absent in the running direction from the exhaust outlet-side end 25a up to 30% of $L_w$.

In another preferable example, the length $L_1$ of the first catalytic layer 261 in the running direction satisfies $0.3\ L_w<L_1$. This can favorably increase opportunities for contact between the exhaust gas and the OSC material upstream of exhaust gas purification catalyst 10 (in entrance cell 24). As a result, the OSC can be further increased. It can also increase the warm-up performance of the catalyst. From such a standpoint is satisfies preferably $0.5\ L_w<L_1$, more preferably $0.6L_w<L_1$, or particularly preferably $0.65\ L_w<L_1$.

The second catalytic layer 262 is formed in the interior of partition wall 26 in contact with exit cell 25, from the exhaust outlet-side end 25a in the running direction of partition wall 26.

The length $L_2$ of the second catalytic layer 262 in the running direction is not particularly limited as long as it is less than the total length $L_w$ of partition wall 26 in the running direction (i.e. $L_2<L_w$). When $L_2<L_w$ is satisfied, the increase in pressure loss can be favorably reduced. From such a standpoint, $L_2$ preferably satisfies $L_2<0.9L_w$, or more preferably $L_2<0.8L_w$. In other words, in the interior of partition wall 26 in contact with exit cell 25, it is preferable that the second catalytic layer 262 is not formed in the running direction from the exhaust inlet-side end 24a over at least 10% (preferably 20%) of $L_w$. In the embodiment shown in FIG. 3, $L_2 \approx 0.5L_w$, and the second catalytic layer 262 is absent in the running direction from the exhaust inlet-side end 24a up to 50% of $L_w$.

Although it also depends on the length $L_1$ of the first catalytic layer 261, etc., it is particularly preferable to satisfy $0.4L_w < L_2 < 0.6L_w$ in an embodiment. This can combine reduction of pressure loss and the effects of this invention at a high level.

In a preferable embodiment, the total length $L_w$ of partition wall 26, the length $L_1$ of the first catalytic layer 261 and the length $L_2$ of the second catalytic layer 262 satisfy the next inequality $L_w < (L_1 + L_2) < 2L_w$. In other words, in the interior of partition wall 26, the first and second catalytic layers 261 and 262 partially overlap each other in the running direction. In the embodiment shown in FIG. 3, $L_1 + L_2 \approx 1.2L_w$. The first and second catalytic layers 261 and 262 are purposefully formed to partially overlap in the running direction so as to eliminate channels that run from entrance cell 24 through catalytic layer-free regions to reach exit cell 25. Thus, it can be made sure that the exhaust gas comes in contact with the catalytic layer(s) (the first catalytic layer 261 and/or the second catalytic layer 262). As a result, the exhaust gas can be more suitably purified to greatly reduce exhaust gas emissions.

The length over which the two catalytic layers (the first and second catalytic layers 261 and 262) overlap in the running direction are not particularly limited because they could be different as well depending on, for instance, the thicknesses (the lengths in a direction perpendicular to the running direction) of the respective catalytic layers. Usually, the overlapping length is at least 2% of the total length $L_w$ of partition wall 26, typically at least 5%, or preferably at least 10%; it can be 40% of $L_w$ or less, preferably 30% or less, for instance, 20% or less. In particular, from the standpoint of reducing the increase in pressure loss while bringing the effects of this invention to a higher level, it is preferably about 10% to 30% (especially about 10% to 20%) of the total length $L_w$ of partition wall 26. In other words, $L_w$, $L_1$ and $L_2$ preferably satisfy the next inequality $1.1L_w \leq L_1 + L_2 \leq 1.3L_w$.

The thickness $T_1$ (the length in a direction perpendicular to the running direction) of the first catalytic layer 261 is not particularly limited because it could be different as well depending on, for instance, the thickness of partition wall 26 and the length of the first catalytic layer 261 in the running direction. The first catalytic layer 261 is typically formed thinner than the total thickness $T_w$ of partition wall 26 so that it is in contact with entrance cell 24, but not in contact with exit cell 25 (i.e. $T_1 < T_w$). In other words, the first catalytic layer 261 is preferably localized towards entrance cell 24 inside partition wall 26. In a favorable embodiment, the thickness $T_1$ of the first catalytic layer 261 satisfies $T_1 < 0.9T_w$ (preferably $T_1 < 0.8T_w$). That is, in the interior of partition wall 26 in contact with exit cell 25, the first catalytic layer 261 is not formed in the running direction from the exhaust inlet-side end 24a through at least 10% (preferably 20%) of $T_w$. This can effectively reduce the overall pressure loss of exhaust gas purification catalyst 10.

The thickness $T_2$ (the length in a direction perpendicular to the running direction) of the second catalytic layer 262 is not particularly limited because it could be different as well depending on, for instance, the thickness of partition wall 26 and the length of the second catalytic layer 262 in the running direction. The second catalytic layer 262 is typically formed thinner than the total thickness $T_w$ of partition wall 26 so that it is in contact with exit cell 25, but not in contact with entrance cell 24 (i.e. $T_2 < T_w$). In other words, the second catalytic layer 262 is preferably localized to the side of exit cell 25 in partition wall 26. In a favorable embodiment, the thickness $T_2$ of the second catalytic layer 262 satisfies $T_2 < 0.9T_w$ (preferably $T_2 < 0.8T_w$). That is, in the interior of partition wall 26 in contact with entrance cell 24, the second catalytic layer 262 is not formed in the running direction from the exhaust outlet-side end 25a through at least 10% (preferably 20%) of $T_w$. This can effectively reduce the overall pressure loss of exhaust gas purification catalyst 10.

The respective thicknesses $T_1$ and $T_2$ of the first and second catalytic layers 261 and 262 can be generally at least 20% of the total thickness $T_w$ of partition wall 26, typically at least 30%, or preferably at least 40%, for instance, at least 50%. This can combine an increase in OSC, a decrease in pressure loss and greater retention of purification performance, at a higher level. In the embodiment shown in FIG. 3, $T_1 \approx T_2 \approx 0.8T_w$.

The thickness $T_1$ of the first catalytic layer 261 can be the same as or different from the thickness $T_2$ of the second catalytic layer 262.

In a preferable embodiment, the total thickness $T_w$ of partition wall 26, the thickness $T_1$ of the first catalytic layer 261 and the thickness $T_2$ of the second catalytic layer 262 satisfy the next inequality $T_w < (T_1 + T_2) < 2T_w$. In other words, in the interior of pertition wall 26, the first and second catalytic layers 261 and 262 partially overlap each other in the thickness direction. In the embodiment shown in FIG. 3, $T_1 + T_2 \approx 1.6T_w$. This can more effectively reduce exhaust gas emissions.

In the interior of partition wall 26 in contact with entrance cell 24, exhaust gas purification catalyst 10 has a first substrate-exposing segment $26N_1$ in an area near (typically next to) the exhaust outlet-side end 25a. The first substrate-exposing segment $26N_1$ is free of the first and second catalytic layers 261 and 262. With the inclusion of the first substrate-exposing segment $26N_1$, the pressure loss can be more certainly reduced to a low level.

The dimensions (length and thickness) of the first substrate-exposing segment $26N_1$ are not particularly limited. For instance, they can be selected in view of the properties of the substrate and the application (e.g. the expected amount of PM formed and the engine power). In a favorable example, the length of the first substrate-exposing segment $26N_1$ is at least $0.1L_w$ in the running direction from the exhaust outlet-side end 25a, and generally less than $0.5L_w$, for instance, $0.1L_w$ to $0.3L_w$. In another favorable example, the thickness of the first substrate-exposing segment $26N_1$ is at least $0.1T_w$ from the surface in contact with entrance cell 24, for instance, $0.1T_w$ to $0.3T_w$. In such an embodiment, while improving the retention of purification performance, the pressure loss can be further reduced. Thus, the effects of this invention can be brought to a higher level.

In a favorable embodiment, in the interior of partition wall 26 in contact with exit cell 25, catalyst 10 has a second substrate-exposing segment $26N_2$ in an area near (typically next to) the exhaust inlet-side end 24a. By this, the increase in pressure loss can be effectively reduced even when, for instance, the first catalytic layer 261 has a relatively high coating density (absolute value). Thus, the effects of this invention can be brought to a higher level.

The dimensions (length and thickness) of the second substrate-exposing segment $26N_2$ are not particularly limited. For instance, they can be selected in view of the properties of the substrate and the application (e.g. the expected amount of PM formed and the engine power). In a favorable example, the length of the second substrate-exposing segment $26N_2$ is at least $0.1 L_w$ in the running direction from the exhaust outlet-side end 25a, for instance, $0.1L_w$ to $0.3L_w$, and preferably $0.4L_w$ to $0.6L_w$. In another favorable example, the thickness of the second substrate-exposing segment $26N_2$ is at least $0.1T_w$ from the surface in contact with exit cell 25, for instance, $0.1T_w$ to $0.3T_w$. In such an embodiment, while improving the retention of purification performance, the pressure loss can be further reduced. Thus, the effects of this invention can be brought to a higher level.

For instance, when the lengths of the two catalytic layers satisfy the next inequality $L_w<(L_1+L_2)$, or when the thicknesses of the two catalytic layers satisfy the next inequality $T_w<(T_1+T_2)$, the first substrate-exposing segment $26N_1$ can be provided not only to areas near the exhaust outlet-side end 25a, but also over a greater region. The first and second substrate-exposing segments $26N_1$ and $26N_2$ can be one three-dimensionally-joined unit.

Such catalytic layers can be formed by the same methods as in the conventional art. For instance, two catalytic layers (the first and second catalytic layers 261 and 262) as shown in FIG. 3 can be formed as follows:

First, a substrate as shown in FIGS. 1 and 2 is obtained. Two different catalytic layer-forming slurries (i.e. a first catalytic layer-forming slurry and a second catalytic layer-forming slurry) are then prepared. Each catalytic layer-forming slurry comprises a desirable catalytic metal component (typically a solution containing ions of a catalytic metal such as Pd, Pt, and Rh) and a desirable OSC material (typically, ceria or a CZ composite oxide) as essential components and may further comprise other optional components (e.g. carrier powder, a promoter, a binder, various other additives, etc.). The properties (viscosity, non-volatile content, etc.) of the slurry can be adjusted in view of the dimensions of the substrate used, the porosity of partition wall 26, the properties of the catalytic layer to be formed, etc.

Subsequently, the prepared first catalytic layer-forming slurry is supplied via the exhaust inlet-side end 24a of the substrate up to the length $L_1$ in the running direction into entrance cell 24. This forms the first catalytic layer 261 with desirable properties in pores of partition wall 26 in contact with entrance cell 24. The properties (e.g. coating density $D_1$, porosity) of the first catalytic layer 261 can be adjusted by the properties, the supplied amount and the number of supplies of the first catalytic layer-forming slurry, etc. For instance, to increase the coating density $D_1$, it is effective to increase the viscosity, the non-volatile content, and the supplied amount of the slurry as well as to supply the slurry several times. The thickness $T_1$ of the first catalytic layer 261 can be adjusted by the supply time of the slurry, by applying pressure to exit cell 25 when supplying the slurry so as to create a pressure gradient between entrance cell 24 and exit cell 25, etc. The slurry can be supplied, dried, and calcined in the same manner as in the conventional catalytic layer formation.

The second catalytic layer-forming slurry prepared above is then supplied via the exhaust outlet-side end 25a of the substrate up to the length $L_2$ in the running direction into exit cell 25. This forms the second catalytic layer 262 with desirable properties in pores of partition wall 26 in contact with exit cell 25. The properties (e.g. coating density $D_2$, porosity) and the thickness $T_2$ of the second catalytic layer 262 can be adjusted in the same manner as in the formation of the first catalytic layer 261, by the properties, the supplied amount, the number of supplies, and the supply time of the second catalytic layer-forming slurry as well as a pressure gradient created between entrance cell 24 and exit cell 25, etc.

After provided with the catalytic layer-forming slurries, the honeycomb substrate is dried and calcined at prescribed temperatures for prescribed time periods. By this, two catalytic layers (the first and second catalytic layers 261 and 262) can be formed as shown in FIG. 3.

Described above is a method where the properties, the supplied amounts and the number of supplies of two different catalytic layer-forming slurries are varied to form two catalytic layers with different coating densities, but it is not limited to this. For instance, two catalytic layers with different coating densities can also be formed by using different carriers (in type and properties) in the two catalytic layer-forming slurries.

In the exhaust gas purification catalyst 10 disclosed herein, the effects of the OSC material(s) included are fully obtained with a higher OSC as compared to conventional products. An increase in OSC can be combined with a decrease in pressure loss at a high level. Accordingly, it can be favorably placed in an exhaust system (exhaust pipe) of, for instance, a gasoline engine or a diesel engine of an automobile.

Described below are Examples related to the present invention. The present invention is not, however, limited to these specific Examples.

[I. Test with Changes in Coating Density of Second Catalytic Layer]

EXAMPLE 1

As a honeycomb substrate, was obtained a cordierite wall-flow substrate (300 cpsi (number of cells per square inch), 0.9 L capacity, 105 mm total length, 103 mm outer diameter, 03 mm partition wall thickness, 59% porosity of partition wall) as shown in FIGS. 1 and 2.

Subsequently, were mixed 40 g of $Al_2O_3$ powder ($\gamma$-$Al_2O_3$) as a carrier, rhodium nitrate with 0.2 g Rh content, and a suitable amount of ion-exchanged water. The resulting mixture was dried and then calcined (at 500° C. for one hour) to obtain a Rh-carrying $Al_2O_3$ powder. In ion-exchanged water, were mixed the resulting powder and a $CeO_2$—$ZrO_2$ composite oxide powder (promoter) in an amount to yield 60 g of CZ composite oxide upon calcination to prepare a first catalytic layer-forming slurry.

The prepared first catalytic layer-forming slurry was then supplied into the entrance cells via the exhaust inlet-side end of the honeycomb substrate and allowed to dry to form a first catalytic layer (length $L_1$ in running direction=70% of total length $L_w$ of partition wall, thickness $T_1$=80% of total thickness $T_w$ of partition wall) in pores of partition walls in contact with the entrance cells. During this, by means of gas supplied from the exhaust outlet-side end of the exit cells, a relative pressure gradient was created between the entrance cells and the exit cells to adjust the depth of the slurry impregnated into the partition walls. In Example 1, the coating density $D_1$ of the first catalytic layer per L of substrate was 65 g/L. In the first catalytic layer, the content density $O_1$ of the OSC material per L of substrate was 36 g/L.

Using a palladium source (palladium nitrate) as the catalytic metal, but otherwise in the same manner as for the first catalytic layer-forming slurry, was prepared a second catalytic layer-forming slurry.

The prepared second catalytic layer-forming slurry was then supplied into the exit cells via the exhaust outlet-side end of the honeycomb substrate and allowed to dry to form a second catalytic layer (length $L_2$ in running direction=50% of total length $L_w$ of partition wall, thickness $T_2$=80% of total thickness $T_w$ of partition wall). During this, in the same manner as in the formation of the first catalytic layer, by means of gas supplied from the exhaust outlet-side end of the exit cells, a relative pressure gradient was created between the entrance cells and the exit cells to adjust the depth of the slurry impregnated into the partition walls. In Example 1, the coating density $D_2$ of the second catalytic layer per L of substrate was 45 g/L. In other words, the coating density ratio ($D_1/D_2$) was 1.44. In the second catalytic layer, the content density $O_2$ of the OSC material per L of substrate was 25 g/L. The catalytic metal-carrying rates were the same between the first and second catalytic layers.

The honeycomb substrate provided with the first and second catalytic layers was allowed to dry at 150° C. for one hour and then calcined at 500° C. for one hour to obtain an exhaust gas purification catalyst (Ex. 1).

In the exhaust gas purification catalyst of Example 1, in the running direction of the partition walls, the first and second catalytic layers overlap over a length equivalent to 20% of the total length $L_w$ of a partition wall. That is, $L_1+L_2=1.2L_w$. In the thickness direction of the partition walls, the first and second catalytic layers also overlap through a thickness equivalent to 60% of the total thickness $T_w$ of a partition wall. That is, $T_1+T_2=1.6T_w$. The exhaust gas purification catalyst of Example 1 has first substrate-exposing segments in the interior of the partition walls in contact with the entrance cells. The first substrate-exposing segments are provided over a length of $0.3L_w$ (30% of $L_w$) in the running direction from the exhaust outlet-side end and through a thickness $0.2T_w$ (20% of $T_w$) in the thickness direction from the surface in contact with the entrance cells. In the interior of the partition walls in contact with the exit cells, the exhaust gas purification catalyst of Example 1 has second substrate-exposing segments. The second substrate-exposing segments are provided over a length of $0.5L_w$ (50% of $L_w$) in the running direction from the exhaust inlet-side end and through a thickness $0.2T_w$ (20% of $T_w$) in the thickness direction from the surface in contact with the exit cells.

EXAMPLE 2, REFERENCE EXAMPLES 1 AND 2

The properties (viscosity and non-volatile content) of the second catalytic layer-forming slurry and the number of supplies were adjusted so as to obtain the coating density values of the second catalytic layers shown in Table 1 below. Otherwise in the same manner as in Example 1, were fabricated an exhaust gas purification catalysts (Ex. 2, Ref. Exs. 1 and 2). The amounts of catalytic metals carried in the catalytic layers were the same in all Examples.

Table 1 below summarizes the features of the catalytic layers.

TABLE 1

Test results with changes in coating density of second catalytic layer

| | 1st Catalytic layer | | | | 2nd Catalytic layer | | | | | Catalytic performance | |
| | | Coating | | OSC | | Coating | | OSC | | | | |
| | $M_{cat}$ | $L_1$ (%) | $D_1$ (g/L) | $O_1$ (g/L) | $M_{cat}$ | $L_2$ (%) | $D_2$ (g/L) | $O_2$ (g/L) | $D_1/D_2$ | $O_1/O_2$ | OSC* | Pressure loss* |
|---|---|---|---|---|---|---|---|---|---|---|---|---|
| Ex. 1 | Rh | 70 | 65 | 36 | Pd | 50 | 45 | 25 | 1.44 | 1.44 | 1.02 | 0.79 |
| Ex. 2 | | | | | | | 55 | 30.5 | 1.18 | 1.18 | 1.01 | 0.88 |
| Ref. Ex. 1 | | | | | | | 65 | 36 | 1 | 1 | 1 | 1 |
| Ref. Ex. 2 | | | | | | | 80 | 44 | 0.81 | 0.82 | 0.99 | 1.14 |

$M_{cat}$: Catalytic metal
*Relative values with the data of Ref. Ex. 1 being 1

<OSC Test>

Figure 4:
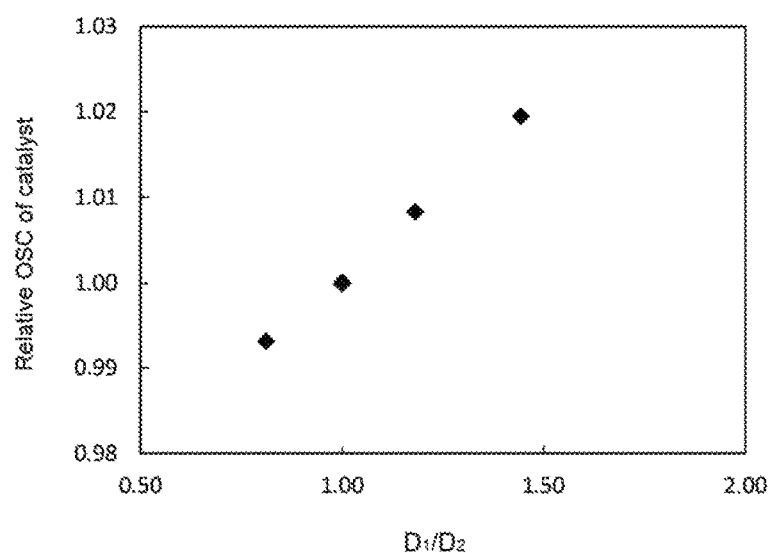
FIG. 4 shows a plot illustrating the relationship between the OSC of the exhaust gas purification catalyst and $D_1/D_2$ under changes in coating density of the second catalytic layer.

The oxygen storage/release capacities (OSC) of the exhaust gas purification catalysts were evaluated. In particular, each exhaust gas purification catalyst was installed in an engine exhaust pipe and an $O_2$ sensor was attached downstream of the exhaust gas purification catalyst. The air/fuel ratio A/F of the gas mixture supplied to the engine was periodically switched between rich and lean ratios. Based on the readings of the $O_2$ sensor, the average oxygen storage/release capacity (OSC) was determined from (1) the operating conditions and the time taken for the catalyst to fully store oxygen after oxygen was completely released and (2) the operating conditions and the time taken for the catalyst to completely release oxygen after oxygen was fully stored. The results are shown in the corresponding column in Table 1. Here, the relative values are shown with the OSC of Reference Example 1 being the standard (1.0). FIG. 4 shows the relationship between the OSC of exhaust gas purification catalyst and $D_1/D_2$.

<Pressure Loss Test>

Figure 5:
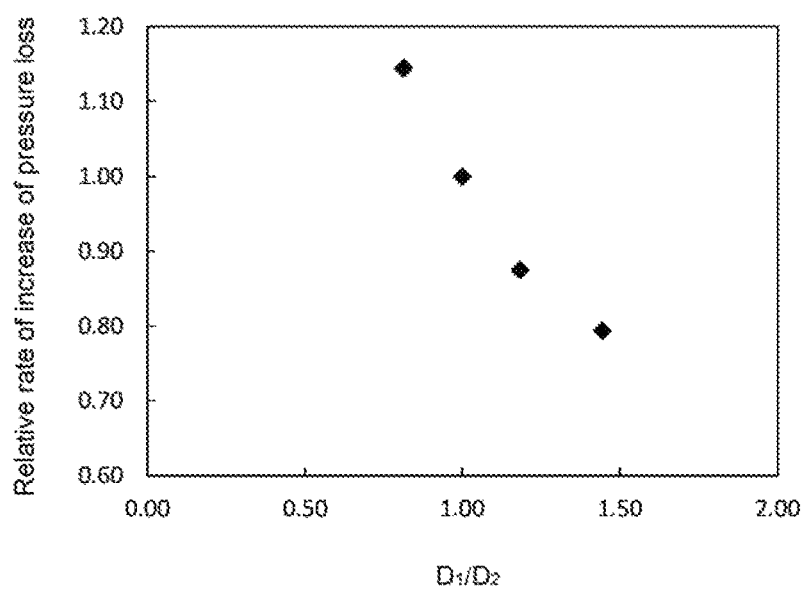
FIG. 5 shows a plot illustrating the relationship between the rate of increase of pressure loss and $D_1/D_2$ under changes in coating density of the second catalytic layer.

With respect to the resulting exhaust gas purification catalysts, rates of increase of pressure loss were determined. In particular, a reference honeycomb substrate prior to coating of catalytic layers was obtained. While a stream of air was passed through at 6 m³/min, the pressure was measured. Similarly to the reference, using each exhaust gas purification catalyst (each honeycomb substrate with catalytic layers) fabricated above, the pressure was measured while a stream of air was passed through at 6 m³/min. The rate (%) of increase of pressure loss was determined by the next expression [(pressure of exhaust gas purification catalyst−pressure of reference)/pressure of reference]×100. The results are shown in Table 1. Here, the relative values are shown with the rate of increase of pressure loss of Reference Example 1 being the standard (1.0). FIG. 5 shows the relationship between the rate of increase of pressure loss and $D_1/D_2$.

As evident from Table 1 and FIG. 4, with respect to the OSC, there was a tendency to increase with increasing coating density ratio ($D_1/D_2$). When the coating density ratio ($D_1/D_2$) was 1.1 or higher (e.g. 1.18 or higher), the OSC materials showed greater effects.

As evident from Table 1 and FIG. 5, with respect to the pressure loss, there was a tendency to decrease with increasing coating density ratio ($D_1/D_2$). When the coating density ratio ($D_1/D_2$) was 1.1 or higher (e.g. 1.18 or higher), the increase in pressure loss was reduced by at least 10%.

In other words, when the coating density $D_2$ (the OSC material content density $O_2$) in the second catalytic layer was decreased, an increase in OSC and a decrease in pressure loss were obtained together at a high level.

[II. Test with Changes in Coating Density of First Catalytic Layer]

EXAMPLES 3 AND 4, REFERENCE EXAMPLE 3

The properties (viscosity and non-volatile content) of the first catalytic layer-forming slurry and the number of supplies were adjusted so as to obtain the coating density values of the first catalytic layers shown in Table 2 below. Otherwise in the same manner as in Example 1, were fabricated exhaust gas purification catalysts (Exs. 3, 4 and Ref. Ex. 3). The amounts of catalytic metals carried in the catalytic layers were the same in all Examples. Table 2 below summarizes the features of the catalytic layers.

Figure 6:
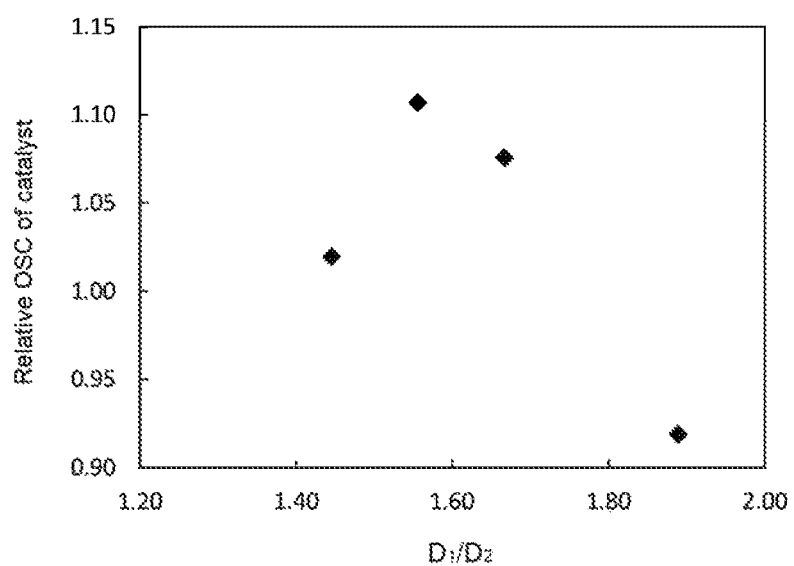
FIG. 6 shows a plot illustrating the relationship between the OSC of exhaust gas purification catalyst and $D_1/D_2$ under changes in coating density of the first catalytic layer.
Figure 7:
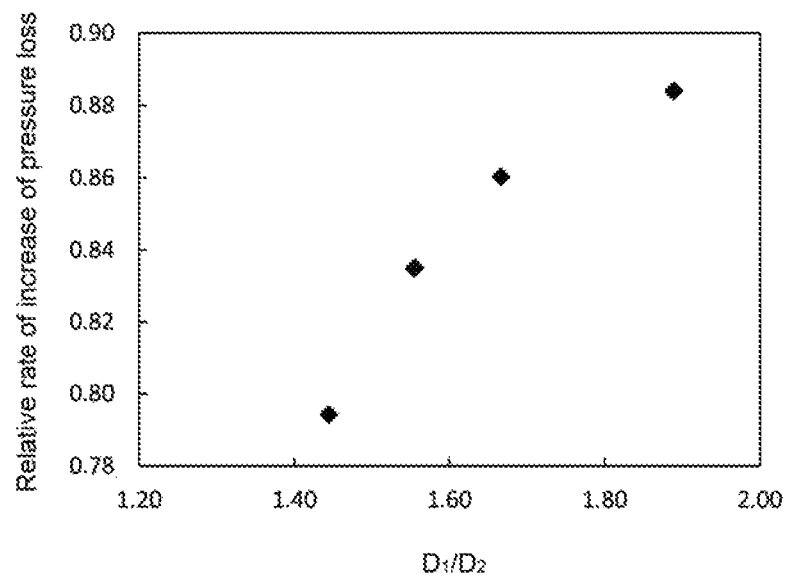
FIG. 7 shows a plot illustrating the relationship between the rate of increase of pressure loss and $D_1/D_2$ under changes in coating density of the first catalytic layer.

In the same manner as in I, above, the OSC of the exhaust gas purification catalysts were evaluated. The results are shown in the corresponding column in Table 2. Here, the relative values are shown with the OSC of Reference Example 1 being the standard (1.0). FIG. 6 shows the relationship between the OSC of exhaust gas purification catalyst and $D_1/D_2$. FIG. 7 shows the relationship between the rate of increase of pressure loss and $D_1/D_2$.

materials showed greater effects. A reason for the decreased OSC at or above the particular coating density $D_1$ (OSC material content density $O_1$) in the first catalytic layer can be that the pressure loss at the first catalytic layer increased and the portions having the first catalytic layer in the partition walls became less permeable to exhaust gas. That is, presumably, the flow rate of the exhaust gas passing through the partition walls increased, whereby the exhaust gas was caused to quickly pass through the catalytic layers.

As evident from Table 1 and FIG. 7, with respect to the pressure loss, there was a tendency to increase (worsen) with increasing coating density ratio ($D_1/D_2$).

From the above, it is more advantageous to have a coating density ratio ($D_1/D_2$) of 1.1 to 1.8 (preferably 1.4 to 1.7) from the standpoint of combining an increase in OSC and a decrease in pressure loss at a high level.

[III. Test with Changes in OSC Material Content Density of First Catalytic Layer]

EXAMPLES 5 AND 6

The OSC material content densities $O_1$ of the first catalytic layer-forming slurry were adjusted to the values shown in Table 3 below. Otherwise in the same manner as in Example 1, were fabricated exhaust gas purification catalysts (Exs. 5 and 6). It is noted that in this experiment, the alumina content density was reduced by as much as the OSC material content density was increased so as to keep the

TABLE 2

Test results with changes in coating density of first catalytic layer

| | 1st Catalytic layer | | | | 2nd Catalytic layer | | | | | | Catalytic performance | |
| | | Coating | | OSC | | Coating | | OSC | | | | |
| | $M_{cat}$ | $L_1$ (%) | $D_1$ (g/L) | $O_1$ (g/L) | $M_{cat}$ | $L_2$ (%) | $D_2$ (g/L) | $O_2$ (g/L) | $D_1/D_2$ | $O_1/O_2$ | OSC* | Pressure loss* |
|---|---|---|---|---|---|---|---|---|---|---|---|---|
| (Ex. 1) | Rh | 70 | 65 | 36 | Pd | 50 | 45 | 25 | 1.44 | 1.44 | 1.02 | 0.79 |
| Ex. 3 | | | 70 | 39 | | | | | 1.56 | 1.56 | 1.11 | 0.83 |
| Ex. 4 | | | 75 | 41.5 | | | | | 1.67 | 1.66 | 1.08 | 0.86 |
| Ref. Ex. 3 | | | 85 | 47 | | | | | 1.89 | 1.88 | 0.92 | 0.88 |

$M_{cat}$: Catalytic metal
*Relative values with the data of Ref. Ex. 1 being 1

As evident from Table 2 and FIG. 6, with increasing coating density $D_1$ (OSC material content density $O_1$) of the first catalytic layer, the OSC increased up until the coating density ratio ($D_1/D_2$) was around 1.5 and the OSC started decreasing when it passed this point. In other words, when the coating density ratio ($D_1/D_2$) was around 1.5, the OSC reached the highest point. When the coating density ratio ($D_1/D_2$) was 1.4 to 1.8 (e.g. 1.44 to 1.67), the added OSC coating density constant. The amounts of catalytic metals carried in the catalytic layers were the same in all Examples. Table 3 below summarizes the features of the catalytic layers.

In the same manner as in I. above, the OSC and the pressure loss of the exhaust gas purification catalysts were evaluated. The results are shown in the corresponding column in Table 3.

TABLE 3

Test results with changes in OSC density of first catalytic layer

| | 1st Catalytic layer | | | | 2nd Catalytic layer | | | | | | Catalytic performance | |
| | | Coating | | OSC | | Coating | | OSC | | | | |
| | $M_{cat}$ | $L_1$ (%) | $D_1$ (g/L) | $O_1$ (g/L) | $M_{cat}$ | $L_2$ (%) | $D_2$ (g/L) | $O_2$ (g/L) | $D_1/D_2$ | $O_1/O_2$ | OSC* | Pressure loss* |
|---|---|---|---|---|---|---|---|---|---|---|---|---|
| (Ex. 1) | Rh | 70 | 65 | 36 | Pd | 50 | 45 | 25 | 1.44 | 1.44 | 1.02 | 0.79 |
| Ex. 5 | | | | 42 | | | | | | 1.68 | 1.04 | 0.76 |
| Ex. 6 | | | | 48 | | | | | | 1.92 | 1.06 | 0.75 |

$M_{cat}$: Catalytic metal
*Relative values with the data of Ref. Ex. 1 being 1

As evident from Table 3, the OSC increased with increasing OSC material content density $O_1$ in the first catalytic layer. In addition, the pressure loss decreased with increasing OSC material content density $O_1$ in the first catalytic layer. One reason for this can be that alumina had a higher bulk density than the CZ composite oxide. In other words, it can be thought that because the highly-bulky alumina content was decreased, broader flow channels were available for the exhaust gas, thereby reducing the pressure loss.

Specific embodiments of the present invention are described above, but these are merely for illustration and do not limit the scope of the claims. The art according to the claims include various modifications and changes made to the specific embodiments illustrated above.

REFERENCE SIGNS LIST 1 honeycomb substrate
1a end
2 closed section
4 opening
6, 26 partition walls
10 exhaust gas purification catalyst
22 plug
24 entrance cell
24a exhaust inlet-side end
25 exit cells
25a exhaust outlet-side end
261 first catalytic layer
262 second catalytic layer
$26N_1$ first substrate-exposing segment
$26N_2$ second substrate-exposing segment

The invention claimed is:

1. A wall-flow-type exhaust gas purification catalyst to be placed in an exhaust pipe of an internal combustion system to purify exhaust gas emitted from the internal combustion system, the exhaust gas purification catalyst comprising:
a substrate having a wall-flow structure with an exhaust inlet-side end and an exhaust outlet-side end, the substrate having an entrance cell that is open on the exhaust inlet-side end and an exit cell that is open on the exhaust outlet-side end, separated with a porous partition wall,
a first catalytic layer provided to an internal portion of the partition wall in contact with the entrance cell, having a length $L_1$ from the exhaust inlet-side end in the running direction of the partition wall with $L_1$ being less than the total length $L_w$ of the partition wall in the running direction,
a second catalytic layer provided to an internal portion of the partition wall in contact with the exit cell, having a length $L_2$ from the exhaust outlet-side end in the running direction of the partition wall with $L_2$ being less than the total length $L_w$ of the partition wall in the running direction; wherein
in the internal portion of the partition wall in contact with the entrance cell, near the exhaust outlet-side end, the exhaust gas purification catalyst has a substrate-exposing segment free of the first and second catalytic layers,
each of the first and second catalytic layers comprises an oxygen storage material, and
the first catalytic layer has a coating density $D_1$ and the second catalytic layer has a coating density $D_2$ with a $D_1/D_2$ ratio value of 1.1 or higher, but 1.8 or lower.

2. The exhaust gas purification catalyst according to claim 1 wherein $D_1/D_2$ is 4 or higher, but 1.7 or lower.

3. The exhaust gas purification catalyst according to claim 1 having an overall average catalyst coating density $D_A$ of 40 g/L or greater, but 150g/L or less.

4. The exhaust gas purification catalyst according to claim 1 wherein the first catalytic layer has an oxygen storage material content $O_1$ per L of the substrate and the second catalytic layer has an oxygen storage material content $O_2$ per L of the substrate, satisfying $O_1 > O_2$.

5. The exhaust gas purification catalyst according to claim 4 having an $O_1$ to $O_2$ ratio $(O_1/O_2)$ of 1.4 or higher, but 1.7 or lower.

6. The exhaust gas purification catalyst according to claim 4 wherein the oxygen storage material content $O_1$ is 30 g/L or greater, but 50 g/L or less; and the oxygen storage material content $O_2$ is 20 g/L or greater, but 35 g/L or less.

7. The exhaust gas purification catalyst according to claim 1 wherein each of the first catalytic layer and the second catalytic layer comprises the oxygen storage material as a promoter carrying no catalytic metal.

8. The exhaust gas purification catalyst according to claim 1 wherein the first catalytic layer comprises rhodium.

9. The exhaust gas purification catalyst according to claim 1 wherein the second catalytic layer comprises palladium.

10. The exhaust gas purification catalyst according to claim 1 wherein the first and second catalytic layers are formed to partially overlap each other in the running direction, with $L_w$, $L_1$ and $L_2$ satisfying the next inequality:

$$L_w < (L_1 + L_2) < 2L_w.$$

11. The exhaust gas purification catalyst according to claim 1 wherein
the partition wall has a total thickness $T_W$ in a direction perpendicular to the running direction of the partition wall,
the first catalytic layer has a thickness $T_1$,
the second catalytic layer has a thickness $T_2$, and
the first and second catalytic layers are formed to partially overlap each other in the thickness direction, with $T_W$, $T_1$ and $T_2$ satisfying the next inequality:

$$T_W < (T_1 + T_2) < 2T_w.$$

12. The exhaust gas purification catalyst according to claim 1, wherein the first catalytic layer and the second catalytic layer are unevenly distributed in the internal portion of the partition wall.

13. The exhaust gas purification catalyst according to claim 1, wherein
when a partition wall cross section of the first catalytic layer is analyzed under an electron microscope, with the overall coating density over a length $0.1L_w$ from the exhaust inlet-side end in the running direction being 100%, the density distribution of the first catalytic layer present in the inside of the partition wall is 80% or higher, and
when a partition wall cross section of the second catalytic layer is analyzed under an electron microscope, with the overall coating density over a length $0.1L_w$ from the exhaust outlet-side end in the running direction being 100%, the density distribution of the second catalytic layer present in the inside of the partition wall is 80% or higher.

* * * * *